United States Patent Office 3,314,685
Patented Apr. 18, 1967

3,314,685
LOW-LOADING ROAD VEHICLE
Peter William Bothwell, 7 Red House Lane,
Westbury-on-Trym, Bristol, England
Filed Jan. 20, 1964, Ser. No. 338,981
5 Claims. (Cl. 280—6)

The invention relates to low-loading road vehicles and in particularly, but not exclusively, to ambulances.

In the past, it has been usual to base the design of ambulances on the chassis of a commercial vehicle having a solid back-axle drive, with consequent high floor and restricted space, and where the design has been based upon a passenger car chassis with advanced suspension it does not meet space requirements and also has a floor some distance from the ground. Steps and ramps on such vehicles are difficult to negotiate with stretchers, trolleys, carrying chairs and by disabled persons, while tail lifts do not help with stretchers and trolleys and involve handling of patients.

It is a further disadvantage of the known kind of ambulances based upon the chassis of a commercial vehicle that the suspension system, judged by the best standards, is primitive and transmits much vibration and road shock to the patient.

The primary object of the present invention is to provide an ambulance which is easy to load and unload with stretchers, trolleys, carrying chairs and disabled persons, while a further object of the invention is to provide a suspension system on such a vehicle which is comparable with the best suspension systems available at this time.

The invention consists in a road vehicle having a chassis or frame supporting an engaine and the body, and having suspension means for the support of the chassis or frame from the wheels in which the height of the chassis or frame is adjustable in relation to the ground by such an extent that the chassis or frame may be lowered onto the ground for loading and unloading.

The invention further consists in a road vehicle as set forth in the preceding paragraph in which the suspension means comprises the lifting and lowering means combined with spring suspension and a shock absorber for each wheel.

The invention still further consists in a road vehicle as set forth in the preceding paragraph in which each lifting and lowering means comprises a fluid pressure operated piston and cylinder. The pressure fluid for operating the piston and cylinder is provided by a pump driven by the engine or battery of a vehicle while each wheel may be attached to the chassis or frame by a pair of wishbones, while the suspension means is hingeably attached at its upper end to the vehicle.

The accompanying drawings show, by way of example only, one embodiment of the invention, in which:

FIGURE 3 is a general perspective view of the ambulance with portions cut away to show the mode of construction, while.

Figure 1:
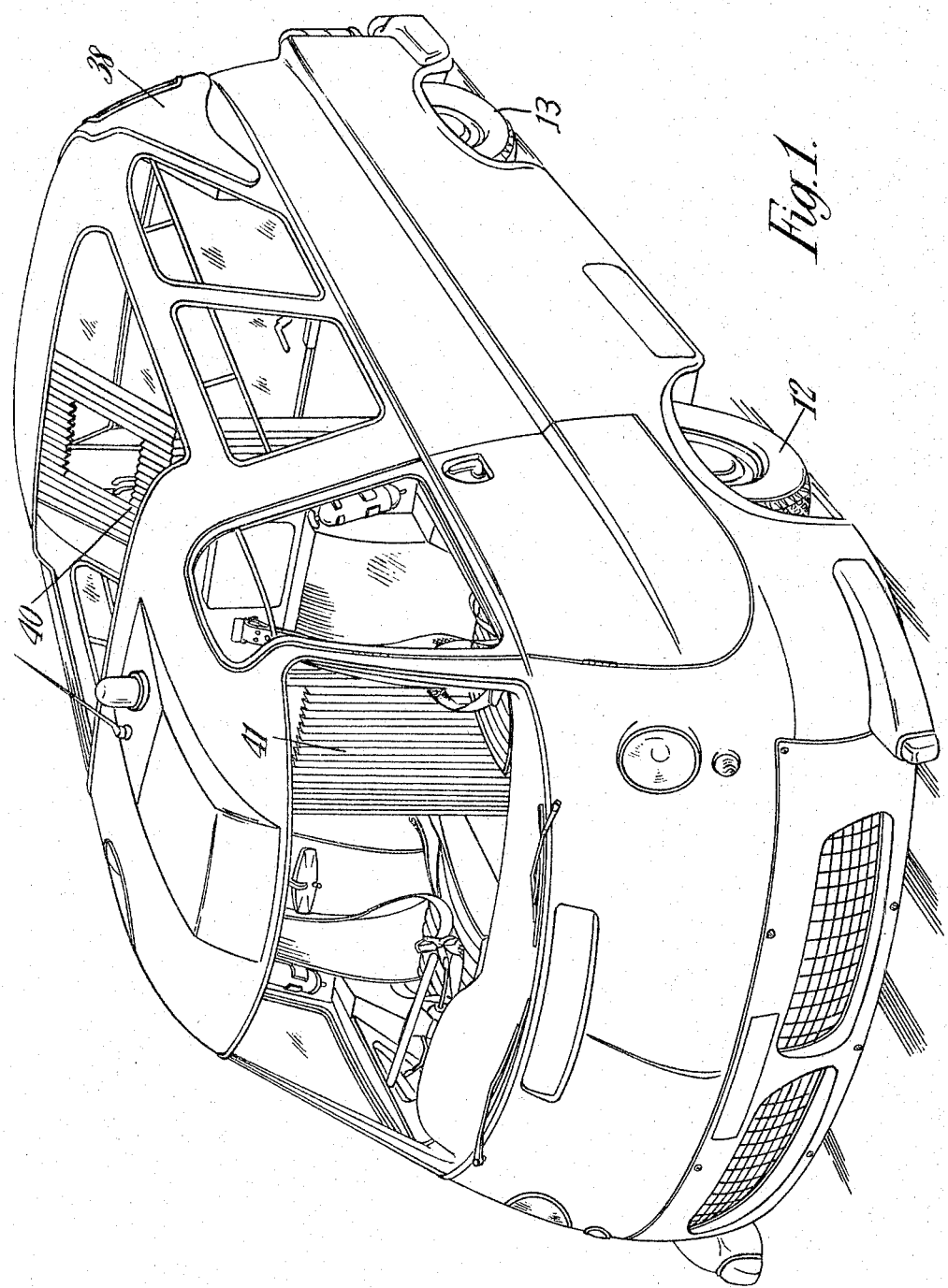
FIGURE 1 is a general perspective view of an ambulance constructed in accordance with the present invention.

The body of the ambulance is bulit up upon a chassis comprising a pair of hollow booms 1, 2 one along each side of the vehicle and joined by a stressed floor 3. Two hoop-like bulk head members, the one 4 towards the front and the other 5 towards the rear, support the upper end bearing 6 and 7 respectively for the fluid pressure operated lifting and lowering means and the springing means 8 and 9 respectively.

These bulk head members are moulded together with the chassis onto the body, which it is preferred to be made of fibre-glass construction, and so form a light and torsionally rigid structure.

In order that the floor may be positioned as close as possible to the bottom of the chassis, a front wheel drive is provided, thus clearing the whole of the rear compartment of mechanical drive components.

The engine 10, which with advantage is of a six cylinder horizontally opposed design built in one unit with its gear box, 11, and drives the front wheels 12 by the shafts 14 by way of the universal joints 16, these wheels being independently sprung. Likewise, the rear wheels 13 are independently sprung. It is also an advantage if the engine is air-cooled so as to be unaffected by climatic variations.

The suspension for each wheel comprises a double wishbone 17, 18 in conjunction with coil springs 19, with orthodox hydraulic dampers (incorporated in the coils springs 19) for normal running. The hydraulic cylinders 20 are primarily for the purpose of changing the length of the connection between the wishbones 17 and 18 and the bearings 6 and 7 on the bulk head members 4 and 5, so that the general height of the chassis and body may be varied in relation to the ground, when the vehicle is stationary, and so that in one position the vehicle is in condition for running upon the ground, while in another position the chassis rests upon the ground for the purpose of loading and unloading the vehicle. The general height of the chassis and thus the ground clearance can be varied from around 9" to 18". Very rough ground can thus be traversed.

When the vehicle is in the lowered position, and because the floor is placed as low as is practical on the chassis, it is possible to wheel trolleys into and out of the ambulance by way of the short ramp 21, and besides this it is very easy to carry stretchers into the ambulance and for disabled persons to walk in and out.

The hydraulic cylinders 20 are connected at their upper ends to a U-shaped bracket 22 fastened to the adjacent bulk head hoop frame and are hingeable upon bearings 6 and 7 respectively, and each house a piston to which is fastened a piston rod 23, 24 the lower end of which is provided with a circular plate 25, 26, which acts as an abutment for the upper end of the coil spring 19.

The lower end of each spring 19 rests upon an inwardly projecting bracket member from the hub support member 29 and encloses the telescopic shock absorber. When the cylinders 20 are each provided with hydraulic fluid under pressure by way of the connector 30 above the piston, the chassis is jacked up clear of the ground for running, and the springs and shock absorbers act in the normal manner. When the hydraulic pressure is removed, the chassis settles down onto the ground.

It is also proposed in accordance with the invention to provide a piped connection between the two cylinders on the same side of the vehicle without the possibility of liquid passing between the cylinders on opposite sides of the vehicle while the vehicle is jacked up, and to allow for movement of the piston in the cylinder, due to road shock, by which fluid is passed between the one and the other, and pitching of the vehicle is much reduced. Side to side connection of fluid may be arranged to provide roll stiffness.

Figure 3:
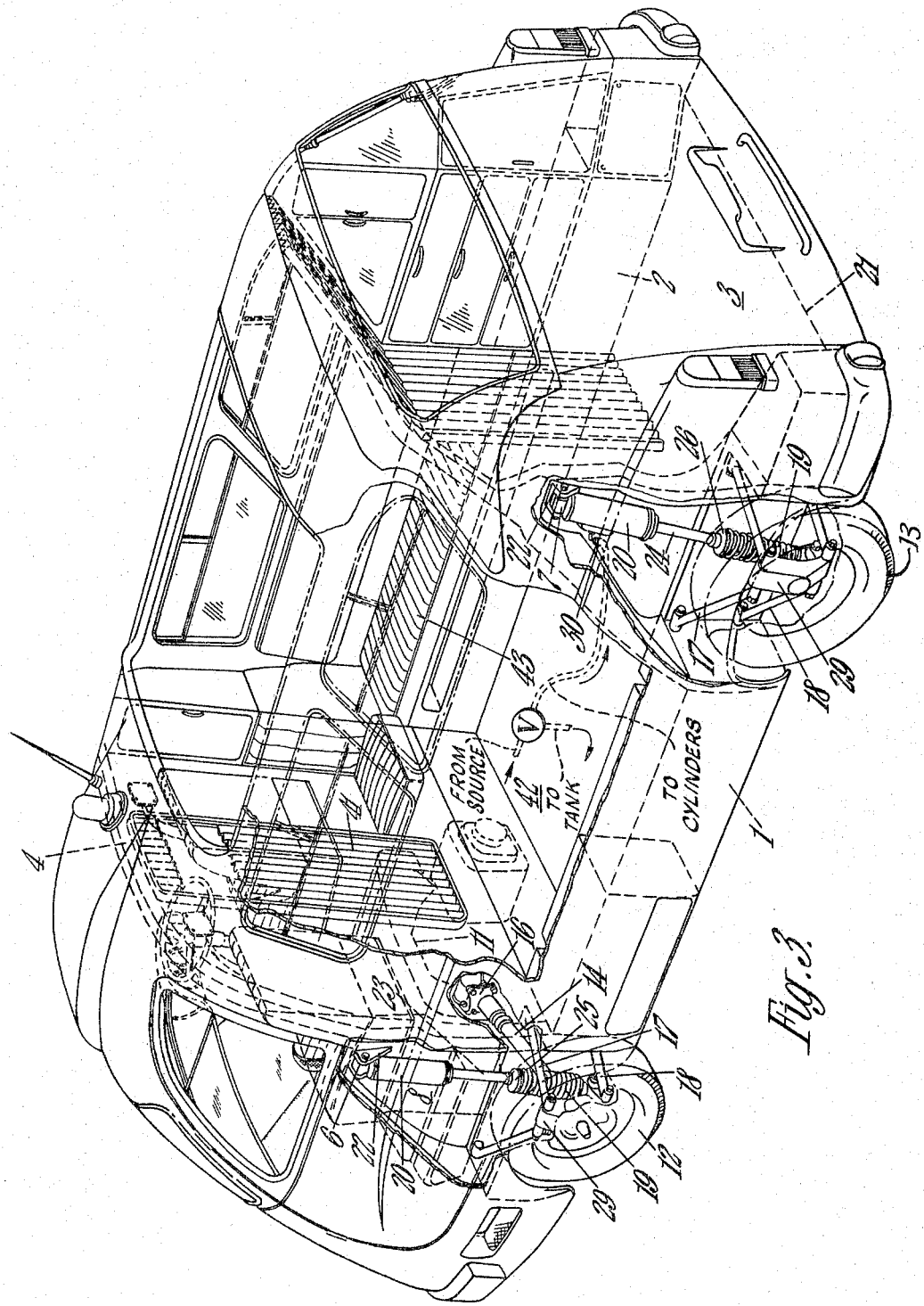

The hydraulic pressure is conveniently provided by a pump attached to the front of, and driven by the engine or battery, and a manually operated control valve, shown diagrammatically at V, FIGURE 3, is provided in the piped connection to the hydraulic cylinders in which, in one position, the pressure fluid is fed to the cylinders, and the chassis and body is lifted to the running position, while in another position the pressure fluid is allowed to escape from the cylinders into a receiver for the fluid. In the running position the valve is arranged such as to prevent the passage of oil from the cylinders on one side of the vehicle to those on the other in accordance with the arrangement described in the immediately preceding paragraph.

It is also proposed to provide a safety device, not shown, which prevents the connection of the drive to the front wheel when the chassis is in the lowered position, while a further safety device, comprising a mechanical lock associated with each hydraulic cylinder may be provided, which allows a limited freedom of relative movement between the piston rod 23, 24 and the cylinders 20 for damping purposes when running, as previously described, but which prevents the lowering of the chassis onto the ground, if a fault should develop in the raising and lowering system, which otherwise would render the vehicle immobile. This lock may also be connected to the hand brake of the vehicle so that the brake cannot be disengaged until the vehicle is raised and the lock is in position. Although it is preferred to use a hydraulic liquid to operate the lifting and lowering means, it is also within the scope of the invention to provide a pneumatically operated system.

It is also proposed to provide facilities for operating the lifting and lowering means in such a way as to adjust the level of the floor of the vehicle to coincide with a step or platform by maintaining pressure in the cylinders to keep the chassis at the required level. Furthermore, should the rear of the vehicle come to rest on an elevated pathway such as a ramp, before the front of the vehicle reaches the ground, the escape of the hydraulic fluid may be stopped, and the body thus prevented from tipping.

Figure 4:
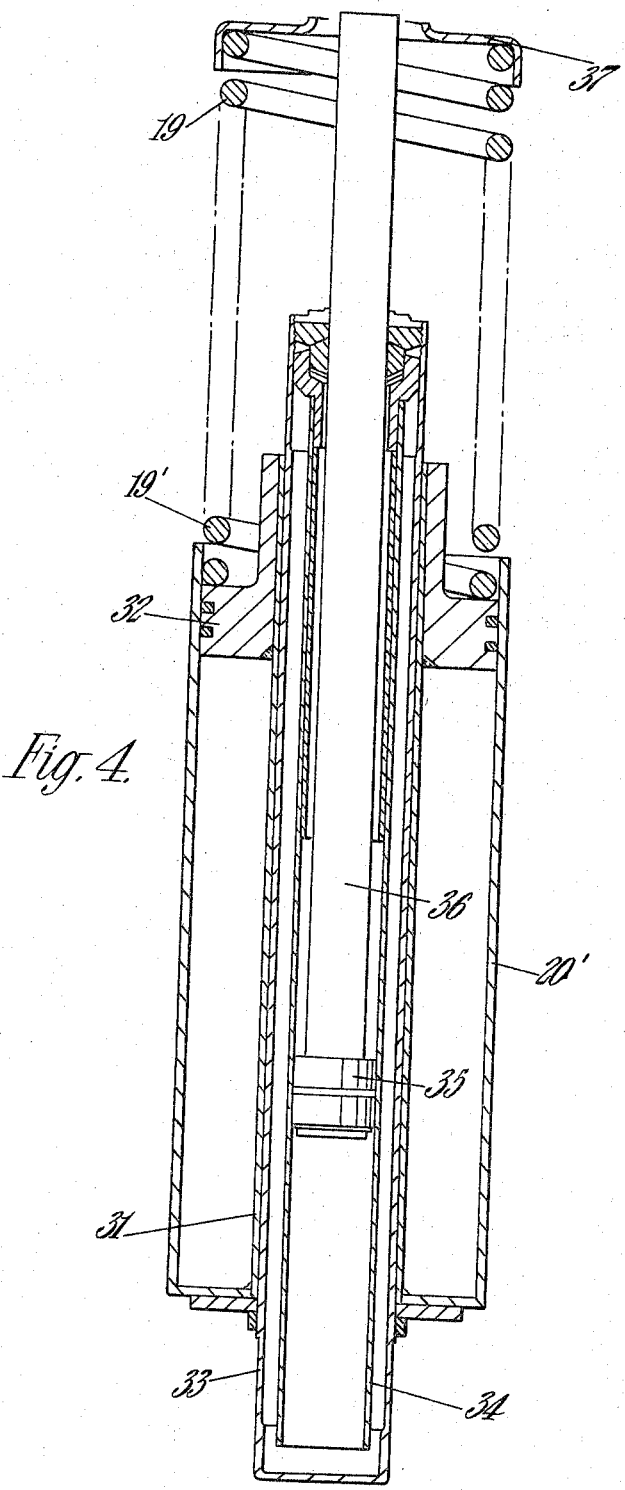
FIGURE 4 is a longitudinal section of an alternative form of construction of the fluid pressure operated lifting and lowering means and springing means.

In the alternative arrangement of the fluid pressure operated lifting and lowering means and springing means shown in FIGURE 4, the cylinder 20' is positioned below, and the spring 19' is above. The cylinder 20' is provided with an inner sleeve 31 and the piston 32, which supports the spring 19', is of an annular form. Within the sleeve 31 there is provided a telescopic shock absorber comprising the outer cylinder 33, the inner cylinder 34, and the piston 35, connected by the piston rod 36 to a common head, not shown, with the support plate 37 for the spring 19'; the head being provided with a bearing 6, 7 as for the previously described form of construction. By this means a more compact arrangement is provided.

Although it is most convenient to use fluid pressure operated lifting and lowering means for the chassis, the same purpose may be served by mechanical or electrically operated lifting and lowering means.

The body of the ambulance is provided with a door 38 at the rear, of the "up and over" type in two parts, of which the lower part 39 is slideable within the upper part when the door is opened, to give unobstructed entrance. If desired, this action can be carried out by hydraulic means. The second heat retaining door 40 of concertina type is fitted inside the main rear door, and it need only be opened slightly for attendants or walking patients to get in and out. Thus, the chilling of the patient compartment is reduced. A further door 41 of the concertina type is provided in the front bulk head between the driver's compartment and the patient's compartment.

Figure 2:
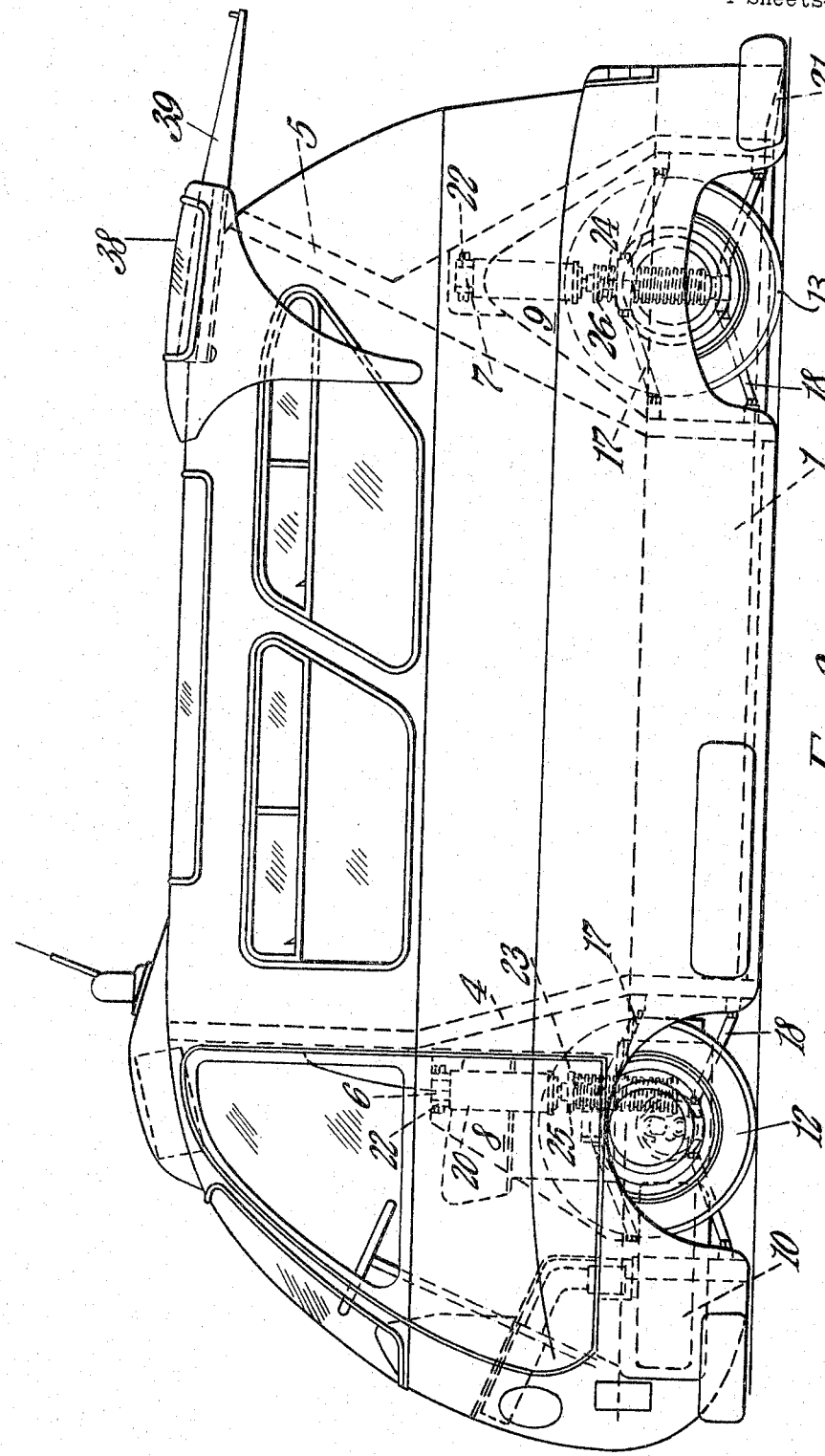
FIGURE 2 is a side elevation of the ambulance with the body resting on the ground for loading and unloading.

The ambulance is shown in FIGURES 1 and 2 with the body in the lowered position, and in FIGURE 3 in the raised position.

In the arrangement shown in FIGURE 3, space 42 is provided for a trolley on the near side of the patient's compartment, while a seat 43 is provided for sitting patients, but alternatively a space for trolleys may be provided on both sides if desired, or the seat may be made removable.

The design allows ample room both on the side, and above the trolley, so that artificial respiration or other treatment can be given without difficulty during the journey. Furthermore, the method of construction of the ambulance body allows ample head room to be provided up to as much as six feet, without the overall height of the vehicle being excessive. It may be clearly seen that an ambulance constructed in accordance with the present invention provides not only greatly improved access and egress over what has been previously proposed, but also allows the provision of an advanced type of suspension which results in a more comfortable ride for the patient. Furthermore, the construction of the vehicle in accordance with the invention allows the one to provide better accommodation for the patient than heretofore, without the vehicle being of excessive dimensions.

It is to be understood, although the vehicle hereinbefore described is an ambulance, the invention is also applicable with advantage to many other forms of vehicle, where the facilities for low loading are required, and that details for carrying the invention into effect may be varied without departing from the scope of the invention.

I claim:

1. A road vehicle comprising a unitary rigid load supporting frame, two road-engaging wheels providing the sole support for the rear of said frame and two other road-engaging wheels providing the sole support for the front of said frame, separate means for individually mounting each wheel on said frame, each mounting means including a unit comprising co-axially disposed resilient means and power operated extensible and retractable means, means connecting one end of each unit to the associated wheel, means connecting the opposite end of each unit to said frame, one of said last two mentioned means including hinge means, the travel of said extensible and retractable means being such that when retracted, both the front and rear of said frame are in engagement with the road to facilitate loading of said vehicle and when extended both the front and rear of said frame are raised above the road in running position, said frame comprising a hollow boom disposed along one side of said vehicle, a second hollow boom disposed along the opposite side of said vehicle, and a stressed floor connecting said booms to provide a unitary structure, each of said hinge means comprising a pair of wishbones for hingedly attaching each wheel to the adjacent boom, and each extensible and retractable means comprising a hydraulic cylinder.

2. A road vehicle as defined in claim 1 and including a rear hoop-like bulkhead member adjacent the rear of said vehicle and carried by said frame and a front hoop-like bulkhead member adjacent the front of said vehicle and carried by said frame, said opposite ends of said units at the rear being connected to said rear bulkhead member and said opposite ends of said units at the front being connected to said front bulkhead member.

3. A road vehicle as defined in claim 1 and including valve means for controlling the flow of hydraulic pressure fluid to and from each of said hydraulic cylinders.

4. A road vehicle as defined in claim 1 in which each of said units is provided with a co-axially disposed shock absorber.

5. A road vehicle as defined in claim 4 in which each of said units comprises an annular cylinder, an annular piston received in said annular cylinder to provide said extensible and retractable means, said resilient means comprising a helical spring having one end engaging said annular piston, a second cylinder disposed co-axially within said annular cylinder, said annular piston and said spring, and a second piston received in said second cylinder and connected to one end of said unit to provide a shock absorber.

References Cited by the Examiner
UNITED STATES PATENTS

| | | | |
|---|---|---|---|
| 2,047,336 | 7/1936 | Stout | 296—28 X |
| 2,443,433 | 6/1948 | Sanmori | 280—124 |
| 2,592,391 | 4/1952 | Butterfield. | |
| 2,650,108 | 8/1953 | Bruce | 267—34 X |
| 2,654,633 | 10/1953 | Runkle | 280—43.18 X |
| 2,774,604 | 12/1956 | Rendel | 280—43.18 X |
| 2,890,064 | 6/1959 | Hudson | 280—112 |
| 2,892,636 | 6/1959 | Walker | 267—34 X |
| 2,896,965 | 6/1959 | Moustakis. | |
| 2,907,578 | 10/1959 | Taber | 280—112 |
| 2,912,235 | 11/1959 | Walker. | |
| 3,038,739 | 6/1962 | Vogel. | |
| 3,071,394 | 1/1963 | Miller. | |
| 3,149,829 | 9/1964 | Baum | 267—64 X |
| 3,173,671 | 3/1965 | Broadwell | 267—64 |
| 3,177,965 | 4/1965 | Dews | 267—20 X |

BENJAMIN HERSH, *Primary Examiner.*

W. A. MARCONTELL, P. GOODMAN,
*Assistant Examiners.*